United States Patent
Wildgoose (10) Patent No.: US 10,697,932 B2
(45) Date of Patent: Jun. 30, 2020

(54) METHOD OF ASSOCIATING PRECURSOR AND PRODUCT IONS

(71) Applicant: Micromass UK Limited, Wilmslow (GB)

(72) Inventor: Jason Lee Wildgoose, Stockport (GB)

(73) Assignee: MICROMASS UK LIMITED, Wilmslow (GB)

( * ) Notice: Subject to any disclaimer, the term of this patent is extended or adjusted under 35 U.S.C. 154(b) by 1000 days.

(21) Appl. No.: 15/035,908

(22) PCT Filed: Nov. 11, 2014

(86) PCT No.: PCT/GB2014/053335
§ 371 (c)(1),
(2) Date: May 11, 2016

(87) PCT Pub. No.: WO2015/071649
PCT Pub. Date: May 21, 2015

(65) Prior Publication Data
US 2016/0274058 A1    Sep. 22, 2016

(30) Foreign Application Priority Data

Nov. 12, 2013 (EP) .................................... 13192591
Nov. 12, 2013 (GB) .................................... 1319961

(51) Int. Cl.
*H01J 49/00* (2006.01)
*G01N 27/62* (2006.01)
*H01J 49/42* (2006.01)

(52) U.S. Cl.
CPC ........ *G01N 27/622* (2013.01); *H01J 49/0027* (2013.01); *H01J 49/0031* (2013.01); *H01J 49/0045* (2013.01); *H01J 49/421* (2013.01)

(58) Field of Classification Search
USPC ....................................................... 250/282
See application file for complete search history.

(56) References Cited

U.S. PATENT DOCUMENTS

| | | | |
|---|---|---|---|
| 6,992,283 B2 | 1/2006 | Bateman et al. | |
| 7,417,223 B2 * | 8/2008 | LeBlanc | H01J 49/0036 250/282 |
| 7,586,088 B2 | 9/2009 | Bateman et al. | |
| 7,622,711 B2 | 11/2009 | Wildgoose et al. | |
| 8,822,914 B2 * | 9/2014 | Goshawk | H01J 49/0027 250/281 |
| 8,916,386 B2 * | 12/2014 | Hughes | G01N 33/6848 436/173 |
| 9,697,996 B2 * | 7/2017 | Brown | H01J 49/0045 |
| 2015/0041636 A1 | 2/2015 | Giles et al. | |

OTHER PUBLICATIONS

Kanu et al., "*Ion Mobility—Mass Spectrometry*", Journal of Mass Spectrometry, vol. 43, No. 1, pp. 122, 2008.
"*Mass Spectrometry/Mass Spectrometry*", Introduction to Mass Spectrometry, Fourth Edition, pp. 173-228, 2000.
Steiner et al., "*Electrospray Ionization with Ambient Pressure Ion Mobility Separation and Mass Analysis by Orthogonal Time-of-Flight Mass Spectrometry*", Rapid Communications in Mass Spectrometry, vol. 15, pp. 2221-2226, 2001.

\* cited by examiner

*Primary Examiner* — Phillip A Johnston (57) ABSTRACT

A method of mass spectrometry is disclosed comprising selecting a modification of interest that may modify the mass to charge ratios of precursor ions of interest when said precursor ions are subjected to a fragmentation or reaction condition for producing product ions. The method then filters the product ions (or product ion data) such that only a subset of the product ions are transmitted and detected (or a subset of the data remains) and so as to exclude product ions (or product ion data) that could not have possibly resulted from the modification of interest. This significantly simplifies the product ion data, enabling the product ions to be identified or compared to precursor ion spectra more efficiently.

17 Claims, 1 Drawing Sheet

METHOD OF ASSOCIATING PRECURSOR AND PRODUCT IONS

CROSS REFERENCE TO RELATED APPLICATIONS

This application is the National Stage of International Application No. PCT/GB2014/053335, filed 11 Nov. 2014 which claims priority from and the benefit of United Kingdom patent application No. 1319961.7 filed on 12 Nov. 2013 and European patent application No. 13192591.9 filed on 12 Nov. 2013. The entire contents of these applications are incorporated herein by reference.

BACKGROUND TO THE PRESENT INVENTION

The present invention relates to a method of mass spectrometry and a mass spectrometer that filters product ions.

Approaches such as $MS^e$ and $HDMS^e$ have proven useful in unbiased high sensitivity MSMS applications. In $MS^e$ the ion population is repeatedly switched between two or more modes of operation. In one of these modes of operation the ion population remains substantially un-fragmented and thus predominately consists of precursor ions. In another one of these modes, the ion population undergoes fragmentation and thus the resulting population predominately consists of product ions. The two or more populations are acquired using a mass spectrometer and product ions are assigned to precursor ions based on chromatographic precursor peak profile characteristics such as liquid chromatography retention time or peak shape. Whilst this approach has proven useful it does suffer from limited precursor ion to product ion assignment specificity in complex mixtures due to the relatively low peak capacity or resolution of the liquid chromatographic separation.

An improvement to this approach introduces a fast ion mobility separation device between the liquid chromatography separation stage and the fragmentation stage. This technique is commonly known as $HDMS^e$. Whilst the peak capacity of each of ion mobility separation (IMS) and liquid chromatography separation is relatively low, the two separation techniques are not strongly correlated and so the combination of the techniques results in a substantially increased peak capacity at the point of fragmentation. In $HDMS^e$ the fidelity of the ion mobility separation is maintained through the fragmentation process and through subsequent devices, allowing precursor ions to be assigned to fragment ions based on IMS drift times and peak shapes as well as liquid chromatography retention times and peak shapes. The combination of these two approaches greatly increases the precursor ion to product ion assignment specificity in complex mixtures.

Data directed analysis (DDA) has conventionally been seen as an alternative approach to $MS^e$ and $HDMS^e$. In DDA techniques, a MS survey scan is used to identify components of interest and once these components have been identified they are isolated using a mass filter, for example a quadrupole mass filter, before undergoing fragmentation and fragment ion mass analysis. The information in the fragment ion mass spectra, together with the precursor ion information, leads to a highly specific/selective experiment. In some application areas $MS^e$ and DDA have been combined to produce a more targeted DDA experiment that is sometimes referred to as '$MS^e$ triggered DDA'. For example, product and precursor ion populations may be interrogated for potential neutral losses by looking for differences in mass to charge ratio values, that are associated with a target neutral loss, between peaks in the precursor and product ion spectra. This may be useful as a neutral loss can be indicative of a particular group of components of interest. Once a potential neutral loss has been identified the quadrupole mass filter may isolate the precursor ion, which is then fragmented and the fragment ions mass analysed. As with $MS^e$ techniques, this method suffers from relatively low specificity in complex mixtures.

It is therefore desirable to provide an improved method of mass spectrometry and an improved mass spectrometer.

SUMMARY OF THE PRESENT INVENTION

From a first aspect the present invention provides a method of mass spectrometry comprising:

defining a group of precursor ions of interest having known combinations of ion mobilities and mass to charge ratios;

selecting a modification of interest that may modify the mass to charge ratios of the precursor ions of interest when said precursor ions are subjected to a fragmentation or reaction condition for producing product ions;

defining a group of potential ions of interest that are associated with the same combinations of ion mobilities and mass to charge ratios as the precursor ions of interest, except wherein the mass to charge ratios of the ions are adjusted according to the mass to charge ratio of the modification of interest, wherein said step of defining the group of potential ions of interest comprises adjusting the mass to charge ratio of each precursor ion of interest according to the mass to charge ratio of the modification of interest so as to provide the mass to charge ratios of the potential ions of interest;

wherein in a first mode said method further comprises:

separating precursor ions according to ion mobility;

subjecting the separated precursor ions to said fragmentation or reaction condition so as to produce product ions that are separated from each other according to the ion mobilities of their respective precursor ions; and either (i) mass filtering the separated product ions with a mass filter, wherein the mass to charge ratios transmitted by the mass filter are varied with time so as to only transmit selected ones of the product ions and wherein, for each of the selected product ions transmitted, the combination of mass to charge ratio of the product ion and the ion mobility of its respective precursor ion correspond to a combination of mass to charge ratio and ion mobility in said group of potential ions of interest; or (ii) mass analysing the separated product ions so as to obtain mass spectral data that includes, for each product ion, the mass to charge ratio of the product ion and the ion mobility of its respective precursor ions; and filtering the resulting mass spectral data so as to include only data corresponding to selected ones of the product ions; wherein, for each of the selected product ions, the combination of mass to charge ratio of the product ion and the ion mobility of its respective precursor ion correspond to a combination of mass to charge ratio and ion mobility in said group of potential ions of interest.

The present invention filters the product ions (or product ion data) such that only a subset of the product ions are transmitted and detected (or a subset of the data remains) and so as to exclude product ions (or product ion data) that could not have possibly resulted from the modification of interest. This significantly simplifies the product ion data, enabling the product ions to be identified or compared to precursor ion spectra more efficiently. Furthermore, once the potential product ions of interest have been transmitted by the mass filter (or once the data has been filtered), the ion mobility data associated with the product ions may no longer needed and may be discarded. This reduces the amount of data stored, transmitted and processed.

Steiner et al "Electrospray ionization with ambient pressure ion mobility separation and mass analysis by orthogonal time-of-flight mass spectrometry" (RAPID COMMUNICATIONS IN MASS SPECTROMETRY, Vol. 15, No. 23, 15 Dec. 2001 (2001 Dec. 15), pages 2221-2226, XP055141230) discloses a method of mass spectrometry in which the ion mobilities and mass to charge ratios of parent ions are analysed. The parent ions may also be fragmented and the fragment ions analysed. Parent ions may then be assigned to fragment ions that are detected and that correspond to fragment ions which are expected to be generated from the parent ions.

However, Steiner et al does not disclose selecting a modification of interest that may modify the mass to charge ratios of the precursor ions, and then defining a group of potential ions of interest by adjusting the mass to charge ratio of each precursor ion according to the mass to charge ratio of the selected modification of interest. Rather, Steiner et al simply has a list fragment ions that might be expected to be generated during fragmentation and uses this list to identify fragment ions that are related to the parent ions. Steiner et al therefore has to search through all of the spectral data to determine if the expected fragment ions are present. In contrast, the present invention mass filters the product ions so as to only transmit product ions that could theoretically support the modification of interest, or the present invention filters the spectral data so as to only include data corresponding to ions that could theoretically support the modification of interest. The present invention therefore provides an improvement over Steiner et al.

US 2004/245452 discloses a method of selecting a charge state of ions of interest by using a combination of their ion mobility and mass to charge ratio. However, this document does not disclose defining a group of precursor ions of interest and then selecting a modification of interest that may affect these precursor ions when subjected to a fragmentation or reaction condition. Consequently, U.S.'452 also does not disclose defining a group of potential ions of interest as having the same combinations of ion mobilities and mass to charge ratios as the precursor ions of interest, except wherein the mass to charge ratios are adjusted according to the mass to charge ratio of the modification of interest. U.S.'452 therefore also does not disclose filtering the ions or data so as to only transmit ions or obtain data corresponding to the group of potential ions of interest. As such, U.S.'452 cannot filter the ions or data so as to exclude product ions or product ion data that could not possibly have resulted from the modification of interest.

Preferably, the group of precursor ions of interest and the group of potential ions of interest include a plurality of different types of ions.

Preferably, the method further comprises subjecting said precursor ions of interest to ion mobility analysis and/or mass analysis in order to determine said known combinations of ion mobilities and mass to charge ratios.

Alternatively, the mass to charge ratios and/or ion mobilities may be looked up in a library of data, rather than being experimentally obtained as part of the claimed method.)

Preferably, the method comprises transmitting the separated product ions to the mass filter and varying the mass to charge ratios transmitted by the mass filter with time as a function of the ion mobilities of the precursor ions so as to only transmit said selected product ions.

The transmitted product ions from said step (i) may be detected or mass analysed so as to produce first mass spectral data in said first mode, and the method may further comprise mass analysing precursor ions in a second mode so as to obtain second mass spectral data. The first and second mass spectral data may be compared, and the method may comprise determining a first precursor ion in the second mass spectral data that has a mass or mass to charge ratio difference to a product ion in the first mass spectral data that corresponds to the mass or mass to charge ratio of the modification of interest.

This determines which precursor ions are likely to have been subjected to the modification of interest and which precursor ions may therefore be desired to be subjected to further investigation.

After the selected product ions are transmitted by the mass filter, the data relating to the ion mobilities of their respective precursor ions may be discarded so that the ion mobilities of their respective precursor ions are not used in said step of comparing the first and second mass spectral data.

This reduces the amount of data stored, transmitted and processed and therefore simplifies the step of comparison step for detecting which precursor ions may be desired to be investigated further.

Said step (ii) preferably further comprises storing the filtered data.

Said step (ii) may further comprise mass analysing precursor ions in a second mode so as to obtain precursor ion mass spectral data, comparing said filtered data to said precursor ion spectral data, and determining a first precursor ion in said precursor ion mass spectral data that differs in mass to charge ratio from a product ion in the filtered data by the mass or mass to charge ratio of the modification of interest.

This determines which precursor ions are likely to have been subjected to the modification of interest and which precursor ions may therefore be desired to be subjected to further investigation.

After the data has been filtered in step (ii), the data relating to the ion mobilities of said respective precursor ions may be discarded so that the data relating to the ion mobilities of said respective precursor ions is not used in said step of comparing said filtered data to said precursor ion spectral data.

This reduces the amount of data stored, transmitted and processed and therefore simplifies the step of comparison step for detecting which precursor ions may be desired to be investigated further.

The method may comprise isolating said first precursor ion from other precursor ions.

The first precursor ions are preferably isolated from all other ions. This may be achieved using a mass filter or other types of ion filter.

The method may further comprise fragmenting or reacting the isolated precursor ion so as to produce product ions, and wherein these product ions are analysed to obtain product ion data.

The product ion data may be used to identify the isolated precursor ion.

Preferably, the step of fragmenting the isolated ion comprises fragmenting the isolated ion by a different fragmentation technique to the fragmentation technique used in the first mode of operation.

Although only one type of precursor ion has been described as being subjected to further investigation, multiple different precursor ions may be investigated further if the comparison between the product ion data and the precursor ion data indicates that multiple different precursor ions differ in mass or mass to charge ratio to product ions by the mass or mass to charge ratio of the modification of interest.

The method may be repeatedly alternated between said first and second modes of operation.

Preferably, the mass to charge ratios of the potential ions of interest are equivalent to the mass to charge ratios of the precursor ions of interest with the mass or mass to charge ratio of the modification of interest subtracted or added.

The modification of interest may be the loss of a neutral group from the precursor ions. If the modification of interest is the loss or addition of a neutral group then the charge state(s) of the precursor ions of interest may need to be known or determined in order to adjust the mass to charge ratio of the precursor ions of interest so as to obtain the mass to charge ratios of the potential product ions of interest.

Alternatively, the modification of interest may be the loss of a fragment ion or the adduct of an adduct ion. The mass to charge ratio of the fragment or adduct ion may be subtracted or added to the mass to charge ratio of the precursor ions of interest in order to obtain the mass to charge ratios of the potential product ions of interest.

The product ions are preferably maintained separated from each other according to the ion mobilities of their respective precursor ions after said fragmentation or reaction. The separation is preferably maintained until the ions are mass filtered in step (i) or have been analysed in step (ii). This maintenance of the separation may be achieved, for example, by applying an axial electric field in the region in which the product ions are generated or by providing one or more potential well/barriers between the product ions derived from different precursor ions. The potential wells/barriers may be traveled along the device so as to keep the product ions separate as they are transported to the detector or analyser. Other means of maintaining the separation are also contemplated.

Although the present invention has been described with reference to the use of ion mobilities and mass to charge ratios to select ions, it is contemplated that physicochemical properties other than these may be used.

Accordingly, from a second aspect the present invention provides a method of mass spectrometry as claimed in claim 15.

For example, the first physicochemical property may be the retention time of sample/analyte molecules in a liquid chromatography device. The sample/analyte molecules may be ionised after leaving the liquid chromatography device so as to form the precursor ions. The first or second physicochemical property may be charge state, mass, chirality, ionisation potential. chemical properties, functional groups and bond strength.

The method according to the second aspect may have any of the optional features described above in relation to the first aspect of the present invention, except wherein the first physicochemical property replaces references to ion mobility and the second physicochemical property replaces references to mass to charge ratio.

The present invention may also be used in a precursor ion discovery mode. Accordingly, from a third aspect the present invention provides a method of mass spectrometry comprising:

defining a group of product ions of interest being associated with known combinations of mass to charge ratios and ion mobilities, wherein said mass to charge ratios are the mass to charge ratios of the product ions and said ion mobilities are the ion mobilities of their respective precursor ions;

selecting a modification of interest that may modify the mass to charge ratios of the precursor ions when subjected to a fragmentation or reaction condition for producing product ions;

defining a group of potential ions of interest that are associated with the same combinations of ion mobilities and mass to charge ratios as the product ions of interest, except wherein the mass to charge ratios of the ions are adjusted according to the mass or mass to charge ratio of the modification of interest, wherein said step of defining the group of potential ions of interest comprises adjusting the mass to charge ratio of each product ion of interest according to the mass to charge ratio of the modification of interest so as to provide the mass to charge ratios of the potential ions of interest; wherein in a first mode said method further comprises:

separating precursor ions according to ion mobility; and either (i) mass filtering the separated precursor ions with a mass filter, wherein the mass to charge ratios transmitted by the mass filter are varied with time so as to only transmit selected ones of the precursor ions and wherein, for each of the selected precursor ions transmitted, the combination of mass to charge ratio and ion mobility correspond to a combination of mass to charge ratio and ion mobility in said group of potential ions of interest; or (ii) mass analysing the separated precursor ions so as to obtain mass spectral data that includes the mass to charge ratio and ion mobility of each precursor ion; and filtering the resulting mass spectral data so as to include only data corresponding to selected ones of the precursor ions; wherein, for each of the selected precursor ions, the combination of mass to charge ratio and ion mobility corresponds to a combination of mass to charge ratio and ion mobility in said group of potential ions of interest.

The method preferably comprises subjecting said product ions of interest to ion mobility analysis and/or mass analysis in order to determine said known combinations of ion mobilities and mass to charge ratios.

The method preferably comprises performing a second mode to determine said known combinations of mass to charge ratios and ion mobilities, said second mode comprising separating precursor ions according to ion mobility, subjecting the separated precursor ions to said fragmentation or reaction condition so as to produce product ions that are separated from each other according to the ion mobilities of their respective precursor ions, and determining the mass to charge ratios of the product ions as a function of the ion mobilities of their respective precursor ions.

The first mode may comprise transmitting the separated precursor ions to the mass filter and varying the mass to charge ratios transmitted by the mass filter with time as a function of the ion mobilities of the precursor ions so as to only transmit said selected precursor ions.

The transmitted precursor ions from step (i) may be detected or mass analysed so as to produce first mass spectral data. The method may further comprise mass analysing product ions in the second mode so as to obtain second mass spectral data, comparing the first and second mass spectral data, and determining a first precursor ion in the first mass spectral data that has a mass or mass to charge ratio difference to a product ion in the second mass spectral data that corresponds to the mass or mass to charge ratio of the modification of interest.

After the selected precursor ions are transmitted by the mass filter, the data relating to their ion mobilities may be discarded so that their ion mobilities are not used in said step of comparing the first and second mass spectral data.

The method may comprise mass analysing product ions in the second mode so as to obtain product ion mass spectral data, comparing said filtered data to said product ion spectral data, and determining a first precursor ion in said precursor ion mass spectral data that differs in mass to charge ratio from a product ion in the filtered data by the mass or mass to charge ratio of the modification of interest.

After the data has been filtered in step (ii), the data relating to the ion mobilities of said precursor ions may be discarded so that the data relating to the ion mobilities of said precursor ions is not used in said step of comparing said filtered data to said product ion spectral data.

The method mat comprise isolating precursor ions transmitted by the mass filter. For example, the method may comprise isolating said first precursor ion from other precursor ions. The method may comprise fragmenting or reacting the isolated precursor ion(s) so as to produce product ions, and these product ions may be analysed to obtain product ion data. The isolated precursor ion(s) may be identified using the product ion data. The step of fragmenting the isolated ion may comprise fragmenting the isolated ion(s) by a different fragmentation technique to the fragmentation technique used in the second mode of operation.

The method may comprise repeatedly alternating the method between said first and second modes of operation.

The mass to charge ratios of the potential ions of interest are preferably equivalent to the mass to charge ratios of the product ions of interest with the mass or mass to charge ratio of the modification of interest subtracted or added.

The modification of interest may be the loss of a neutral group from the precursor ions, the loss of a fragment ion from the precursor ions, or the adduct of an adduct ion to the precursor ions.

Although the method has been described with reference to the use of ion mobilities and mass to charge ratios to select ions, it is contemplated that physicochemical properties other than these may be used.

The present invention also provides a mass spectrometer arranged an configured so as to perform any one of the methods described above.

Accordingly, from a first aspect the present invention provides a mass spectrometer comprising:

means for defining a group of precursor ions of interest having known combinations of ion mobilities and mass to charge ratios;

means for selecting a modification of interest that may modify the mass to charge ratios of the precursor ions of interest when said precursor ions are subjected to a fragmentation or reaction condition for producing product ions;

means for defining a group of potential ions of interest that are associated with the same combinations of ion mobilities and mass to charge ratios as the precursor ions of interest, except wherein the mass to charge ratios of the ions are adjusted according to the mass or mass to charge ratio of the modification of interest, wherein said means is configured to adjust the mass to charge ratio of each precursor ion of interest according to the mass to charge ratio of the modification of interest so as to provide the mass to charge ratios of the potential ions of interest;

an ion mobility separator;

a fragmentation or reaction device;

a controller arranged an adapted to separate precursor ions according to ion mobility in the ion mobility separator; and to fragment or react the separated precursor ions according to said fragmentation or reaction condition in said fragmentation or reaction device so as to produce product ions that are separated from each other according to the ion mobilities of their respective precursor ions;

said mass spectrometer further comprising either:

(i) a mass filter for mass filtering the separated product ions, wherein the controller is configured to vary the mass to charge ratios transmitted by the mass filter with time so as to only transmit selected ones of the product ions and wherein, for each of the selected product ions transmitted, the combination of mass to charge ratio of the product ion and the ion mobility of its respective precursor ion correspond to a combination of mass to charge ratio and ion mobility in said group of potential ions of interest; or (ii) a mass analyser for mass analysing the separated product ions so as to obtain mass spectral data that includes, for each product ion, the mass to charge ratio of the product ion and the ion mobility of its respective precursor ions; and filtering means for being controlled by the controller for filtering the resulting mass spectral data so as to include only data corresponding to selected ones of the product ions; wherein, for each of the selected product ions, the combination of mass to charge ratio of the product ion and the ion mobility of its respective precursor ion correspond to a combination of mass to charge ratio and ion mobility in said group of potential ions of interest.

The mass spectrometer of the first aspect is arranged, configured and adapted to perform any one of the methods described in relation to the method according to the first aspect of the invention.

From a second aspect the present invention also provides a mass spectrometer comprising:

means for defining a set of precursor ions of interest having known combinations of values of first and second physicochemical properties;

means for selecting a modification of interest that may affect the precursor ions of interest when said precursor ions are subjected to a fragmentation or reaction condition for producing product ions;

means for defining a group of potential ions of interest as having the same combinations of values of first and second physicochemical properties as the precursor ions of interest, except wherein the values of the first physicochemical property of the ions are adjusted according to the change in the first physicochemical property that would be induced by the modification of interest;

an ion separator;

a fragmentation or reaction device;

a controller arranged an adapted to separate precursor ions according to the second physicochemical property in the ion separator; and to fragment or react the separated precursor ions according to said fragmentation or reaction condition in said fragmentation or reaction device so as to produce product ions that are separated from each other according to the values of the second physicochemical property of their respective precursor ions;

said mass spectrometer further comprising either:

(i) a filter for filtering the separated product ions according to their first physicochemical property values, wherein the controller varies the first physicochemical property values transmitted by the filter with time so as to only transmit selected ones of the product ions and wherein, for each of the selected product ions transmitted, the combination of the first physicochemical property value of the product ion and the second physicochemical property value of its respective precursor ion correspond to a combination of first physicochemical property value and second physicochemical property value in said group of potential ions of interest; or (ii) an analyser for analysing the separated product ions so as to obtain data that includes, for each product ion, the first physicochemical property value of the product ion and the second physicochemical property value of its respective precursor ions; and a filter for being controlled by the controller for filtering the resulting data so as to include only data corresponding to selected ones of the product ions; wherein, for each of the selected product ions, the combination of first physicochemical property value of the product ion and the second physicochemical property value of its respective precursor ion correspond to a combination of first physicochemical property value and second physicochemical property value in said group of potential ions of interest.

The mass spectrometer of the second aspect is arranged, configured and adapted to perform any one of the methods described in relation to the method according to the second aspect of the invention.

From a third aspect the present invention also provides a mass spectrometer comprising:

means for defining a group of product ions of interest being associated with known combinations of mass to charge ratios and ion mobilities, wherein said mass to charge ratios are the mass to charge ratios of the product ions and said ion mobilities are the ion mobilities of their respective precursor ions;

means for selecting a modification of interest that may modify the mass to charge ratios of the precursor ions when subjected to a fragmentation or reaction condition for producing product ions;

means for defining a group of potential ions of interest that are associated with the same combinations of ion mobilities and mass to charge ratios as the product ions of interest, except wherein the mass to charge ratios of the ions are adjusted according to the mass or mass to charge ratio of the modification of interest, wherein the means is configured to adjust the mass to charge ratio of each product ion of interest according to the mass to charge ratio of the modification of interest so as to provide the mass to charge ratios of the potential ions of interest;

an ion mobility separator;

a fragmentation or reaction device;

a controller arranged an adapted to separate precursor ions according to ion mobility in the ion mobility separator; and to fragment or react the separated precursor ions according to said fragmentation or reaction condition in said fragmentation or reaction device so as to produce product ions that are separated from each other according to the ion mobilities of their respective precursor ions;

said mass spectrometer further comprising either:

(i) a mass filter for mass filtering the separated precursor ions, wherein the mass filter is configured to vary the mass to charge ratios transmitted with time so as to only transmit selected ones of the precursor ions and wherein, for each of the selected precursor ions transmitted, the combination of mass to charge ratio and ion mobility correspond to a combination of mass to charge ratio and ion mobility in said group of potential ions of interest; or (ii) a mass analyser for mass analysing the separated precursor ions so as to obtain mass spectral data that includes the mass to charge ratio and ion mobility of each precursor ion; and filtering means for filtering the resulting mass spectral data so as to include only data corresponding to selected ones of the precursor ions; wherein, for each of the selected precursor ions, the combination of mass to charge ratio and ion mobility corresponds to a combination of mass to charge ratio and ion mobility in said group of potential ions of interest.

The mass spectrometer of the third aspect is arranged, configured and adapted to perform any one of the methods described in relation to the method according to the third aspect of the invention.

The mass spectrometer may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The mass spectrometer may comprise a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENT

A conventional method of $MS^e$ triggered DDA will first be described in order to help illustrate the advantages of the preferred embodiment of the present invention. According to a conventional $MS^e$ technique, an analyte solution elutes from a liquid chromatography device and is ionised. The resulting precursor ions then pass to a fragmentation device which alternates between a low fragmentation mode, which leaves the precursor ions substantially unfragmented, and a high fragmentation mode, which fragments the precursor ions to form product ions. The precursor ions and product ions are mass analysed in the two alternating modes so as to obtain precursor ion spectra and product ion spectra.

The precursor and product ion spectra are then interrogated to determine precursor ions which may be of interest. For example, a neutral loss may be considered to be indicative of a particular group of components of interest. Product and precursor ion populations in the $MS^e$ spectra data are therefore interrogated for potential neutral losses by looking for differences in mass to charge ratio values, that are associated with the target neutral loss, between peaks in the precursor and product ion spectra. Once a potential neutral loss has been identified in the spectra, a quadrupole mass filter isolates the precursor ions that are associated with this neutral loss. These precursor ions are then fragmented and the fragment ions are mass analysed.

However, according to this conventional technique, precursor ions that are considered to be related to certain product ions may not actually be related to each them. For example, although the mass difference between a precursor ion and a product ion may correspond to the mass of a neutral that could be lost from the precursor ion, this does not necessarily mean that the product ion corresponds to the precursor ion with a neutral loss. It may be the case that the product ion is entirely unrelated to the precursor ion and it is merely a coincidence that the mass difference between the two ions corresponds to that of a neutral loss. It will be appreciated that when a complex mixture is analysed it will lead to the detection of many different peaks in the precursor and product ion spectra, and that there are therefore many different mass differences between any given precursor ion and the many product ions. This appearance of such many different mass differences increases the likelihood of product and precursor ions being deemed to be related simply because the mass differences between them are coincidentally the same as, for example, a neutral loss. This conventional method therefore suffers from relatively low specificity in complex mixtures.

The preferred embodiments of the present invention seek to associate precursor ions with product ions. The preferred embodiments of the present invention operate on the principle of reducing the number of candidate product ions that are considered when seeking to associate precursor and product ions.

Figure 1:
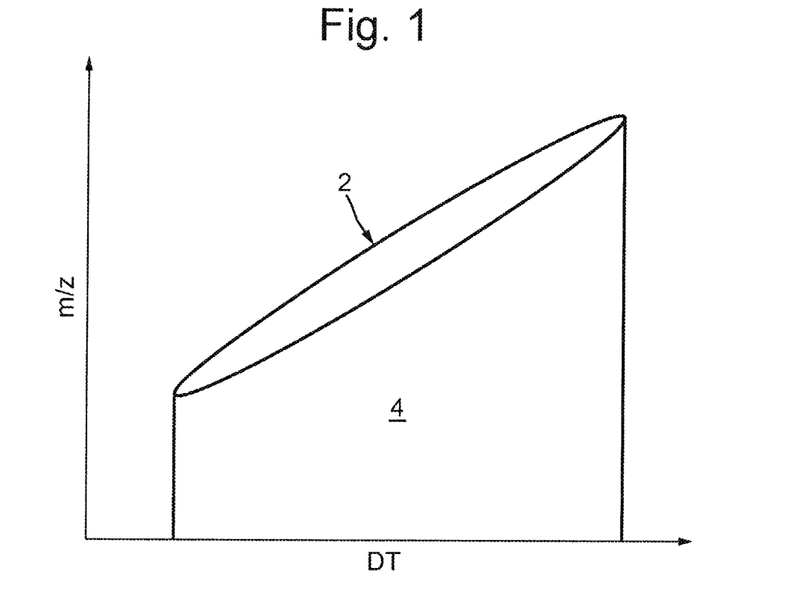
FIG. 1 shows a plot of the product ions that may be generated from a group of precursor ions.

FIG. 1 illustrates a graph of mass to charge ratio of ions verses the drift time of these ions through an ion mobility separator. Singly charged precursor ions of interest 2 are shown as an oval on the plot. These precursor ions 2 reside in a relatively narrow band of mass to charge ratios and drift times through the ion mobility separator. The fragment ions that may be generated, in principle, when these precursor ions are fragmented are illustrated by the area 4 below the oval 2 that represents the precursor ions. In this example, it is assumed that the fidelity of the ion mobility separation of the precursor ions is preserved in the fragment ion data. In other words, the ion mobility drift time associated with any given fragment ion corresponds to the drift time of its precursor ion through the ion mobility separator. This, together with the fact that the fragment ions will have a lower mass to charge ratio that their respective precursor ions, leads to all fragment ions residing in the area 4 on the graph below the precursor ions 2. In this example, fragment ion mass sufficiency, defect and mass range have been ignored for illustrative purposes.

It will be appreciated from the graph shown in FIG. 1 that according to conventional techniques it is necessary to consider a large number of fragment ions when seeking to associate precursor and product ions. The preferred embodiments of the present invention seek to reduce the number of fragment ions that are considered when seeking to associate precursor and product ions.

According to a preferred embodiment of the present invention, precursor ions of interest are identified. The mass to charge ratios and ion mobilities of the precursor ions of interest are known or determined by experiment. It is desired to isolate product ions that may have resulted from a specific modification to the precursor ions of interest when the precursor ions of interest undergo fragmentation or reactions to produce the product ions.

As described above, the precursor ions of interest have known or determined combinations of mass to charge ratio and ion mobility. The mass to charge ratio of the modification of interest is then subtracted from (or added to) the mass to charge ratio of each precursor ion of interest so as to generate potential product ions of interest. Each potential product ion of interest has a mass to charge ratio that corresponds to the mass to charge ratio of a precursor ion of interest, except with the mass of the modification of interest subtracted (or added), and also has the same ion mobility associated with the potential product ion of interest that is associated with its respective precursor ion of interest.

Figure 2:
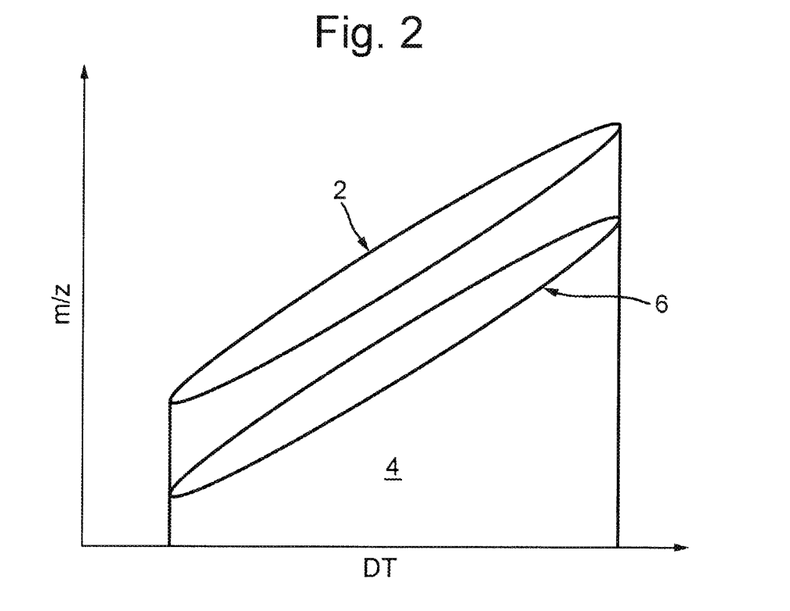
FIG. 2 shows a plot of the fragment ions that may be generated by a group of precursor ions incurring a neutral loss.

FIG. 2 shows an example of how the product ions of interest may be determined. The graph is a plot of mass to charge ratio of ions verses the drift time through an ion mobility separator that is associated with the ions. According to the preferred embodiment, precursor ions of interest are known to have, or are determined to have, the combinations of mass to charge ratios and ion mobilities shown by the upper oval band 2. In this example, the precursor ions are singly charged ions and the modification of interest is considered to be the loss of a specific neutral group ("neutral loss") from the precursor ions of interest 2 during fragmentation. For example, the modification of interest may be the loss of an $H_2O$ or $NH_3$ group. The preferred embodiment subtracts the mass of the neutral loss from each of the precursor ions of interest 2 so as to identify a band of potential product ions of interest 6. As the neutral loss is considered to have a constant mass for all precursor ions of interest 2 and the precursor ions are singly charged ions, this band 6 is parallel to and of lower mass to charge ratio than the band representing the mass to charge ratios and ion mobilities of the precursor ions of interest 2.

The lower band 6 in FIG. 2 represents the combinations of mass to charge ratios and ion mobilities which can be formed by a neutral loss from the precursor ions of interest 2. It will be appreciated that this band 6 represents a significantly smaller set of combinations of mass to charge ratios and ion mobilities than the region 4 of FIG. 1 which represents all of the product ions (i.e. fragment ions) that may theoretically derive from the precursor ions of interest 2.

It is desirable to determine if the fragmentation or reaction of the precursor ions of interest 2 produces any product ions having the modification of interest (e.g. neutral loss). The precursor ions are therefore separated in an ion mobility separator and are then fragmented or reacted so as to form product ions. It is to be noted that the precursor ions that are subjected to the fragmentation or reactions need not consist of only the precursor ions of interest, but may also include other precursor ions. The fidelity of the ion mobility separation of the precursor ions is preserved in the product ions. In other words, the product ions are generated and maintained in a manner such that they are separated from each other such that each product ion is associated with the ion mobility drift time of its respective precursor ion. This fidelity may be preserved by applying an axial electric field in the region in which the product ions are sequentially generated so as to maintain the product ions deriving from different precursor ions separate from each other. Alternatively, one or more potential well/barriers may be used to maintain the separation of the product ions derived from different precursor ions. The potential wells may be traveled along the device so as to keep the product ions separate as they are transported to the detector or analyser. Other means of maintaining the separation are also contemplated.

The fragment ions then pass to a mass filter. The mass filter is scanned with time as a function of the drift time of the ions through the ion mobility separator. More specifically, the mass to charge ratios transmitted by the mass filter are varied as a function of drift time such that only the potential product ions of interest are transmitted. In other words, the transmission window of the mass filter is varied with time so as to only transmit product ions having combinations of mass to charge ratio and ion mobility within the lower oval plot 6 shown in FIG. 2. The ions transmitted by the mass filter can only include product ions having combinations of mass to charge ratio and ion mobility that correspond to a precursor ion of interest 2 that has been modified by a modification of interest. All other product ions have been filtered out by the mass filter. The product ions transmitted by the mass filter are then detected.

The detected product ions may then be compared to the precursor ions of interest in order to determine which product ions are related to which precursor ions. It will be appreciated that by filtering the product ions such that only a subset of the product ions are transmitted and detected, the comparison between the product ions and the precursor ions of interest has been significantly simplified. In particular, product ions which could not have possibly resulted from the modification of interest are eliminated from the comparison.

Furthermore, once the potential product ions of interest have been transmitted by the mass filter, the ion mobility data associated with the product ions is no longer needed and may be discarded. This reduces the amount of data stored, transmitted and processed. A single product ion spectra may be produced that is enriched with product ions that have resulted from the modification of interest.

As described above, the mass to charge ratios of the detected product ions of interest may be compared to the mass to charge ratios of the precursor ions of interest in order to determine which product ions are related to which precursor ions. This may be achieved by examining the mass differences between each of the precursor ions of interest and each of the product ions of interest. When a precursor ion of interest is determined to differ in mass to charge ratio from a product ion of interest by the same amount as the modification of interest then that precursor ion may labelled as a precursor ion for further analysis. Each precursor ion for further analysis may be isolated from other precursor ions by a mass filter and may then be subjected to fragmentation to produce fragment ions. The resulting fragment ions may then be mass analysed and the fragment ion data may be used to identify the precursor ion.

The precursor ions and product ions may be generated and analysed in an $MS^e$ mode of operation. The product ions of interest may then be compared to the precursor ions detected in the low fragmentation mode of the $MS^e$ analysis.

The specificity of the experiment in this method is improved as distracting product ions that could not have resulted from the modification of interest are removed by the mass filter, thus reducing the likelihood of falsely triggering the process of precursor ions being isolated and subjected to further analysis.

Although the present invention has been described with reference to preferred embodiments, it will be understood by those skilled in the art that various changes in form and detail may be made without departing from the scope of the invention as set forth in the accompanying claims.

For example, although the modification of interest has been described as being a neutral loss from the precursor ions of interest, e.g. the loss of a water molecule or an $NH_3$ group etc, other modifications of interest may be used. For example, the modification of interest may be the loss of a particular fragment ion or the gain of a particular adduct ion. Alternatively, the modification of interest may be a neutral mass loss combined with a change in charge state, e.g. from a multiply charged precursor ion.

Furthermore, although the transmission band 6 for the product ions of interest has been described as a continuous band in mass to charge ratio and ion mobility space, the transmission region may be any shape or combination of shapes, and/or may be continuous or non-continuous.

The experiment may be repeated for different modifications of interest.

The method of filtering the product ions may be performed by means other than the mass filter described above. For example, rather than filtering the product ions, the data acquisition system or data storage system for storing product ion data may be controlled so as to vary the product ion data acquired or stored as a function of ion mobility associated with the product ions, e.g. as described in U.S. Pat. No. 6,992,283.

The mass analyser in the present invention may be a Time of Flight mass analyser. The invention may work in combination with other established ToF enhancements, such as EDC/HDC.

The ion mobility separation may be performed by passing ions through a gas filled region, wherein different ions have different mobilities through the gas. Other IMS devices such as differential ion mobility analysis or differential mobility spectrometry may be used.

Although an ion mobility separator has been described for separating the precursor ions and ion mobility has been described for use in selectively transmitting product ions of interest, it is contemplated that other physicochemical properties may be used. For example, the precursor ions may be separated be a mass to charge ratio separator.

Acquisition modes such as multiple reaction monitoring (MRM) are accessible via the approach of the present invention.

As discussed in the first aspect of the present invention, the present invention may mass analyse all of the product ions and then filter the resulting data. Alternatively, as in the embodiments described above, an ion filter (e.g. a quadrupole mass filter) may selectively transmit the product ions of interest. The latter technique allows the loss of the IMS-drift time fidelity after the ion filtering and prior to the ToF analysis of the filtered ions. This improves the dynamic range of the ToF as the concentration effects of compressing ions into IMS peaks is lost before the ions pass to the ToF analyser/detector, reducing the instantaneous maximum ion current. In addition, this ion filtering technique would allow one to improve fill times or duty cycle on charge capacity limited instruments such as ion traps, Orbitraps® etc. The ion filtering approach would also allow one to selectively fill an ion trap with product ions of interest, enriching the ions within the ion trap with the product ions of interest.

The collision energy for fragmenting the precursor ions may be varied as a function of ion mobility drift time of the ions, e.g. as described in U.S. Pat. No. 7,622,711.

The ion transmission maybe varied as a function of drift time through the ion mobility separator. It is recognised that the precursor ions of interest may be determined in a DDA type analysis where a survey scan is used, via a method development steps or via calculation of collisional cross-section and mass to charge ratio.

The device maybe preceded by or followed by a wide range of known ionisation sources, fragmentation techniques or analysers.

The isolation of the precursor ion of interest for the MS/MS experiment may be restricted in drift time, improving specificity and potentially duty cycle, e.g. as described in M-1816.

In principle precursor ion discovery (PID) experiments could be improved via this approach. In this method IMS-DT regions associated with potential precursors are determined from target product ions and only these regions of the precursor IMS-DT space would be filtered/acquired/stored.

The invention claimed is:

1. A method of mass spectrometry comprising:
defining a group of precursor ions having known combinations of ion mobilities and mass to charge ratios;
selecting a modification that may modify the mass to charge ratios of the precursor ions when said precursor ions are subjected to a fragmentation or reaction condition for producing product ions;
defining a group of potential product ions that could be produced as a result of said modification modifying the mass to charge ratios of the precursor ions when said precursor ions are subjected to the fragmentation or reaction condition for producing product ions and that are associated with the same combinations of ion mobilities and mass to charge ratios as the precursor ions, except wherein the mass to charge ratios of the potential product ions are adjusted according to the mass to charge ratio of the modification, wherein said step of defining the group of potential product ions comprises adjusting the mass to charge ratio of each precursor ion according to the mass to charge ratio of the modification so as to provide the mass to charge ratios of the potential product ions;
wherein in a first mode said method further comprises:
separating precursor ions according to ion mobility;
subjecting the ion mobility separated precursor ions to said fragmentation or reaction condition so as to produce product ions that are separated from each other according to the ion mobilities of their respective precursor ions; and either:
(i) mass filtering the ion mobility separated product ions with a mass filter, such that the mass to charge ratios transmitted by the mass filter are varied with time as a function of the ion mobilities of the precursor ions so as to only transmit selected ones of the ion mobility separated product ions and such that, for each of the selected product ions transmitted by the mass filter, the combination of mass to charge ratio of the product ion and the ion mobility of its respective precursor ion corresponds to a combination of mass to charge ratio and ion mobility in said group of potential product ions; or
(ii) mass analysing the ion mobility separated product ions so as to obtain mass spectral data that includes, for each ion mobility separated product ion, the mass to charge ratio of the product ion and the ion mobility of its respective precursor ion; and
filtering the resulting mass spectral data based on the mass to charge ratios of the product ions and the ion mobilities of the precursor ions so as to produce filtered product data that includes only data corresponding to selected ones of the product ions such that, for each of the selected product ions, the combination of mass to charge ratio of the product ion and the ion mobility of its respective precursor ion corresponds to a combination of mass to charge ratio and ion mobility in said group of potential product ions.

2. The method of claim 1, further comprising subjecting said precursor ions of the group of precursor ions to ion mobility analysis and/or mass analysis in order to determine said known combinations of ion mobilities and mass to charge ratios.

3. The method of claim 1, wherein the transmitted selected product ions from step (i) of claim 1 are detected or mass analysed so as to produce first mass spectral data in said first mode, the method further comprising mass analysing precursor ions in a second mode so as to obtain second mass spectral data, comparing the first and second mass spectral data, and determining a first precursor ion in the second mass spectral data that has a mass or mass to charge ratio difference to a product ion in the first mass spectral data that corresponds to the mass or mass to charge ratio of the modification.

4. The method of claim 3, wherein after the selected product ions are transmitted by the mass filter, the data relating to the ion mobilities of their respective precursor ions are discarded so that the ion mobilities of their respective precursor ions are not used in said step of comparing the first and second mass spectral data.

5. The method of claim 1, wherein step (ii) of claim 1 further comprises mass analysing precursor ions in a second mode so as to obtain precursor ion mass spectral data, comparing said filtered data to said precursor ion spectral data, and determining a first precursor ion in said precursor ion mass spectral data that differs in mass to charge ratio from a product ion in the filtered data by the mass or mass to charge ratio of the modification.

6. The method of claim 5, wherein after the data has been filtered in step (ii) of claim 1, the data relating to the ion mobilities of said respective precursor ions is discarded so that the data relating to the ion mobilities of said respective precursor ions is not used in said step of comparing said filtered data to said precursor ion spectral data.

7. The method of claim 5, further comprising isolating said first precursor ion from other precursor ions.

8. The method of claim 7, further comprising fragmenting or reacting the isolated precursor ion so as to produce product ions, and wherein these product ions are analysed to obtain product ion data.

9. The method of claim 8, comprising using the product ion data to identify the isolated precursor ion.

10. The method of claim 8, wherein the step of fragmenting the isolated ion comprises fragmenting the isolated ion by a different fragmentation technique to the fragmentation technique used in the first mode of operation.

11. The method of claim 3, further comprising repeatedly alternating the method between said first and second modes of operation.

12. The method of claim 1, wherein the mass to charge ratios of the potential product ions are equivalent to the mass to charge ratios of the precursor ions in the group of precursor ions with the mass or mass to charge ratio of the modification subtracted or added.

13. The method of claim 1, wherein the modification is the loss of a neutral group from the precursor ions in the group of precursor ions, the loss of a fragment ion from the precursor ions in the group of precursor ions or the adduct of an adduct ion to the precursor ions in the group of precursor ions.

14. A method of mass spectrometry comprising:
defining a set of precursor ions having known combinations of values of first and second physicochemical properties;
selecting a modification that may affect the precursor ions when said precursor ions are subjected to a fragmentation or reaction condition for producing product ions;
defining a group of potential product ions that could be produced as a result of said modification affecting the precursor ions when said precursor ions are subjected to the fragmentation or reaction condition for producing product ions as having the same combinations of values of first and second physicochemical properties as the precursor ions, except wherein the values of the first physicochemical property of the potential product ions are adjusted according to the change in the first physicochemical property that would be induced by the modification;

separating precursor ions according to the second physicochemical property;

subjecting the separated precursor ions to said fragmentation or reaction condition so as to produce product ions that are separated from each other according to the values of the second physicochemical property of their respective precursor ions; and either:

(i) filtering the separated product ions according to their first physicochemical property values with a filter, such that the first physicochemical property values transmitted by the filter are varied with time as a function of the second physicochemical property of the precursor ions so as to only transmit selected ones of the product ions and such that, for each of the selected product ions transmitted by the filter, the combination of the first physicochemical property value of the product ion and the second physicochemical property value of its respective precursor ion corresponds to a combination of first physicochemical property value and second physicochemical property value in said group of potential product ions; or (ii) analysing the separated product ions so as to obtain data that includes, for each product ion, the first physicochemical property value of the product ion and the second physicochemical property value of its respective precursor ion; and filtering the resulting data based on the first physicochemical property of the product ions and the second physicochemical property of the precursor ions so as to produce filtered product data that includes only data corresponding to selected ones of the product ions such that, for each of the selected product ions, the combination of first physicochemical property value of the product ion and the second physicochemical property value of its respective precursor ion corresponds to a combination of first physicochemical property value and second physicochemical property value in said group of potential product ions.

15. A method of mass spectrometry comprising:

defining a group of product ions being associated with known combinations of mass to charge ratios and ion mobilities, wherein said mass to charge ratios are the mass to charge ratios of the product ions and said ion mobilities are the ion mobilities of their respective precursor ions;

selecting a modification that may modify the mass to charge ratios of the precursor ions when subjected to a fragmentation or reaction condition for producing product ions;

defining a group of potential precursor ions that could produce product ions in said group of product ions as a result of said modification modifying the mass to charge ratios of the precursor ions when subjected to the fragmentation or reaction condition for producing product ions and that are associated with the same combinations of ion mobilities and mass to charge ratios as the product ions in said group of product ions, except wherein the mass to charge ratios of the potential precursor ions are adjusted according to the mass or mass to charge ratio of the modification, wherein said step of defining the group of potential precursor ions comprises adjusting the mass to charge ratio of each product ion in the group of product ions according to the mass to charge ratio of the modification so as to provide the mass to charge ratios of the potential precursor ions; wherein in a first mode said method further comprises:

separating precursor ions according to ion mobility; and either:

(i) mass filtering the ion mobility separated precursor ions with a mass filter, such that the mass to charge ratios transmitted by the mass filter are varied with time as a function of the ion mobilities of the precursor ions so as to only transmit selected ones of the ion mobility separated precursor ions and such that, for each of the selected precursor ions transmitted by the mass filter, the combination of mass to charge ratio and ion mobility corresponds to a combination of mass to charge ratio and ion mobility in said group of potential precursor ions; or (ii) mass analysing the ion mobility separated precursor ions so as to obtain mass spectral data that includes the mass to charge ratio and ion mobility of each precursor ion; and filtering the resulting mass spectral data based on the mass to charge ratios of the precursor ions and the ion mobilities of the precursor ions so as to produce filtered product data that includes only data corresponding to selected ones of the precursor ions such that, for each of the selected precursor ions, the combination of mass to charge ratio and ion mobility corresponds to a combination of mass to charge ratio and ion mobility in said group of potential precursor ions.

16. A mass spectrometer arranged and configured so as to perform the method of claim 1.

17. The method of claim 1, further comprising associating a product ion selected according to its mass to charge ratio and the ion mobility of its respective precursor ion to a precursor ion.

* * * * *